United States Patent
Pauli et al.

(10) Patent No.: US 9,556,749 B2
(45) Date of Patent: Jan. 31, 2017

(54) EXHAUST GAS HOUSING FOR A GAS TURBINE AND GAS TURBINE HAVING AN EXHAUST GAS HOUSING

(71) Applicant: ALSTOM Technology Ltd, Baden (CH)

(72) Inventors: Ernst Pauli, Zurich (CH); Mario Dombos, Karlovac (HR); Andreas Kieninger, Nussbaumen (CH); Joachim Krautzig, Ronnenberg (DE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 1092 days.

(21) Appl. No.: 13/705,244

(22) Filed: Dec. 5, 2012

(65) Prior Publication Data

US 2013/0142631 A1    Jun. 6, 2013

(30) Foreign Application Priority Data

Dec. 5, 2011 (CH) .................................. 1922/11

(51) Int. Cl.
*F02C 7/20* (2006.01)
*F01D 25/26* (2006.01)
(Continued)

(52) U.S. Cl.
CPC ............. *F01D 25/14* (2013.01); *F01D 25/162* (2013.01); *F01D 25/26* (2013.01); *F01D 25/30* (2013.01);
(Continued)

(58) Field of Classification Search
CPC ............. F02C 7/20; F02C 7/24; F01D 25/145; F01D 5/25; F01D 5/24; F01D 5/28; F01D 2240/12; F01D 2240/121; F01D 2240/122; F01D 2240/126; F01D 2240/15; F01D 2240/90; F01D 2240/91; F01D 2300/611; F01D 2260/231; F01D 2260/941

See application file for complete search history.

(56) References Cited

U.S. PATENT DOCUMENTS 2,961,150 A * 11/1960 Pirtle ..................... F01D 9/065
                                                                 415/177
3,269,700 A *  8/1966 Myron ..................... F01D 5/18
                                                                  416/95

(Continued)

FOREIGN PATENT DOCUMENTS

| CH | 699998 A1   | 5/2010 |
|----|-------------|--------|
| GB | 2280484 A   | 2/1995 |
| JP | 2010025006 A| 2/2010 |

OTHER PUBLICATIONS

European Patent Office, Search Report in Swiss Patent Application No. 1922/11 (Feb. 9, 2012).

*Primary Examiner* — Eric Keasel
*Assistant Examiner* — Joshua R Beebe
(74) *Attorney, Agent, or Firm* — Buchanan Ingersoll & Rooney PC

(57) ABSTRACT

An exhaust gas housing for a gas turbine, in which an annular gas passage, through which exhaust gas discharges from the gas turbine to the outside, is formed by a concentric inner casing and an outer casing which concentrically encompasses the inner casing at a distance, wherein the inner casing and the outer casing are interconnected by a plurality of radial struts which extend through the gas passage and have in each case a leading edge and a trailing edge with regard to the exhaust gas flowing through the gas passage, and wherein the struts, the outer casing and the inner casing are equipped in each case with a heat-resistant lining towards the gas passage, wherein the lining of the struts is at least partially mechanically decoupled from the (Continued)

lining of the inner casing and/or of the outer casing for reducing thermal stresses on the periphery of the struts.

12 Claims, 3 Drawing Sheets

(51) Int. Cl.
 *F01D 25/14* (2006.01)
 *F01D 25/16* (2006.01)
 *F01D 25/30* (2006.01)
(52) U.S. Cl.
 CPC ............. *F02C 7/20* (2013.01); *F05D 2260/94* (2013.01); *F05D 2260/941* (2013.01)

(56) References Cited

U.S. PATENT DOCUMENTS

| | | | |
|---|---|---|---|
| 3,403,889 A | 10/1968 | Ciokajlo | |
| 5,609,467 A * | 3/1997 | Lenhart | F01D 9/065 415/142 |
| 6,884,029 B2 * | 4/2005 | Beeck | F01D 5/145 415/191 |
| 7,160,084 B2 * | 1/2007 | Ahmad | F01D 5/147 416/231 B |
| 7,597,536 B1 * | 10/2009 | Liang | F01D 5/147 415/115 |
| 7,736,128 B2 * | 6/2010 | Huber | F03B 3/121 416/186 R |
| 2009/0016881 A1 * | 1/2009 | Baldauf | F01D 5/22 416/95 |
| 2010/0086401 A1 * | 4/2010 | Davey | F01D 9/042 415/209.3 |
| 2010/0129210 A1 * | 5/2010 | Headley | F01D 9/041 415/209.3 |
| 2010/0172748 A1 * | 7/2010 | Snook | F01D 9/02 415/191 |
| 2010/0275614 A1 | 11/2010 | Fontaine et al. | |
| 2011/0206519 A1 * | 8/2011 | Heinemann | F01D 5/066 416/204 A |
| 2011/0286834 A1 | 11/2011 | Wardle et al. | |

* cited by examiner

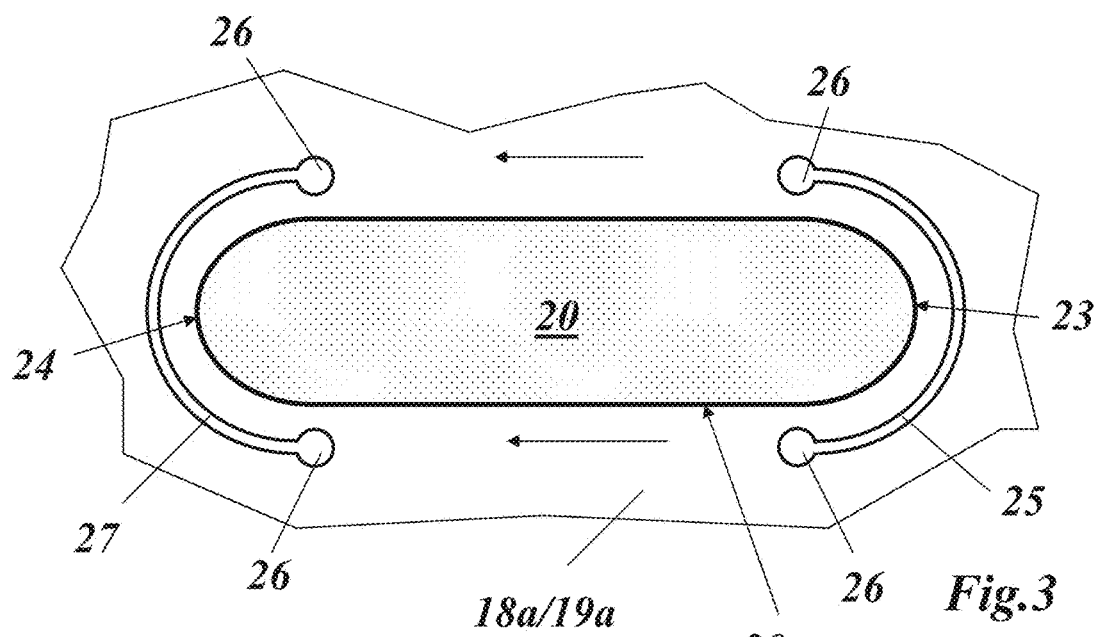
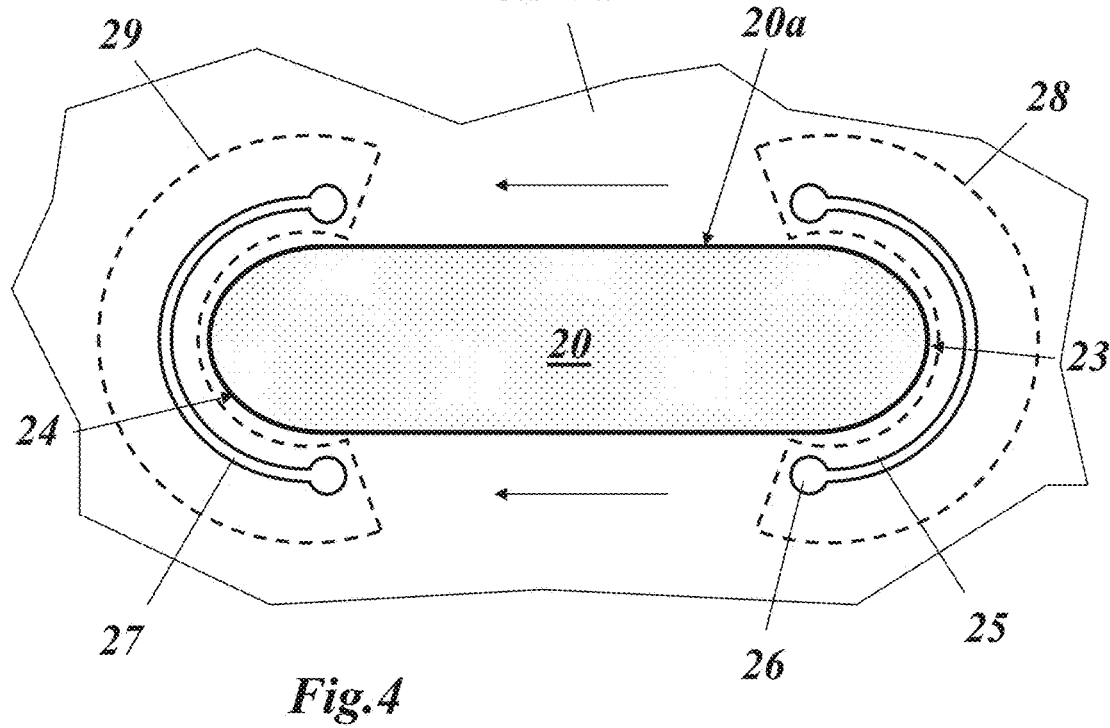

EXHAUST GAS HOUSING FOR A GAS TURBINE AND GAS TURBINE HAVING AN EXHAUST GAS HOUSING

CROSS REFERENCE TO RELATED APPLICATIONS

Priority is claimed to Swiss Patent Application No. CH 01922/11, filed on Dec. 5, 2011, the entire disclosure of which is incorporated by reference herein.

FIELD

The present application relates to the field of gas turbine technology. It refers to an exhaust gas housing for a gas turbine and a gas turbine having such an exhaust gas housing.

BACKGROUND

The present application relates to gas turbines, especially to stationary gas turbines, as are reproduced in FIG. 1 in a perspective, partially sectioned view. FIG. 1 shows a type GT26 gas turbine of the applicant. In this gas turbine 10, combustion air is inducted via an air intake 11 and compressed by a compressor 12 and fed into a first combustion chamber 13 for combusting a fuel. Arranged downstream of the first combustion chamber 13 is a first (high-pressure) turbine 14 which is driven by the hot gases from the first combustion chamber 13. Downstream of the first turbine 14 provision is made for a second combustion chamber 15 in which a fuel is combusted along with the residual oxygen which is present in the hot gases. The hot gases from the second combustion chamber 15 drive a second (low-pressure) turbine 16 before they are discharged via an exhaust gas housing 17 to the outside or (in a combined cycle power plant) into a subsequent heat recovery steam generator.

The exhaust gas housing 17 comprises an (essentially cylindrical) inner casing 19 which is concentrically encompassed by an outer casing 18 at a distance therefrom. Extending through the two casings is an annular gas passage (21 in FIG. 2) through which the hot exhaust gases (22 in FIG. 2) are discharged from the gas turbine 10. For protection against the exhaust gases, the outer casing 18 and the inner casing 19 are provided in each case with a lining 18a or 19a. The exhaust gas housing 17 also comprises a support construction with which are associated struts 20 which are arranged in a circumferentially distributed manner, extend radially between outer casing 18 and inner casing 19, and are also equipped with a lining (20a in FIG. 2). In the prior art, the linings 20a and 18a or 19a merge into each other without a gap and so form a continuous lining which protects the struts 20 and also the casings 18 and 19 against the hot exhaust gases, as is shown by way of example for one strut 20 in FIG. 2.

It has been revealed in the past that with such a design of the linings or of the exhaust gas housing 17 cracks already occur after a short operating time in the encompassing linings 18a and 19a, to be specific especially at the transitions from the radial struts 20 to the encompassing linings 18a and 19a.

Disclosed in printed document U.S. Pat. No. 3,403,889 is an exhaust gas housing in which the inner boundary of the exhaust gas passage is formed by means of an inner housing which is provided with openings through which the radial struts extend in a slidable manner. The inner housing is movably connected to an inner frame section and can freely expand and contract when the temperature of the hot flow gases in the passage alters. This known solution is limited, however, by the (lacking) connection between struts and inner casing. Furthermore, a completely different constructional design of the housing is required from the outset in this case.

Printed document JP2010025006 proposes to provide additional, annular, welded connecting elements at the transitions between the struts and the linings of the casings for absorbing thermal stresses.

It is proposed in printed document US 2010/0275614 A1 to weld struts to the linings of the casings around the circumference and to additionally apply welded reinforcing seams on the leading edges and trailing edges of the struts in the transition regions in order to be able to better absorb thermal stresses which occur there.

In both cases, the thermal stresses are not relieved or eliminated but absorbed by means of additionally applied reinforcements so that the loads still exist to the full extent at the critical points.

SUMMARY

An embodiment of the invention provides an exhaust gas housing for a gas turbine, the exhaust gas housing comprising an annular gas passage, configured to discharge an exhaust gas from the gas turbine to the outside, wherein the annular gas passage is formed by a concentric inner casing and an outer casing which concentrically encompasses the inner casing at a distance, wherein the inner casing and the outer casing are interconnected by a plurality of radial struts which extend through the gas passage and include in each case a leading edge and a trailing edge with regard to the exhaust gas flowing through the annular gas passage, wherein the radial struts include a third heat-resistant lining, the outer casing includes a first heat-resistant lining, and the inner casing includes a second heat-resistant lining, in each case towards the annular gas passage, and wherein the third heat-resistant lining of the struts is at least partially mechanically decoupled from (i) the first heat-resistant lining, (ii) the second heat-resistant lining, or (iii) the first heat-resistant lining and the second heat-resistant lining for reducing thermal stress on a periphery of the struts.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 3 shows, as seen in the radial direction, a mechanically decoupled strut according to an exemplary embodiment of the invention with stress relief cuts on the leading edge and trailing edge;

FIG. 4 shows the cover of the stress relief cuts from FIG. 3 according to a further exemplary embodiment of the invention;

DETAILED DESCRIPTION

Figure 1:
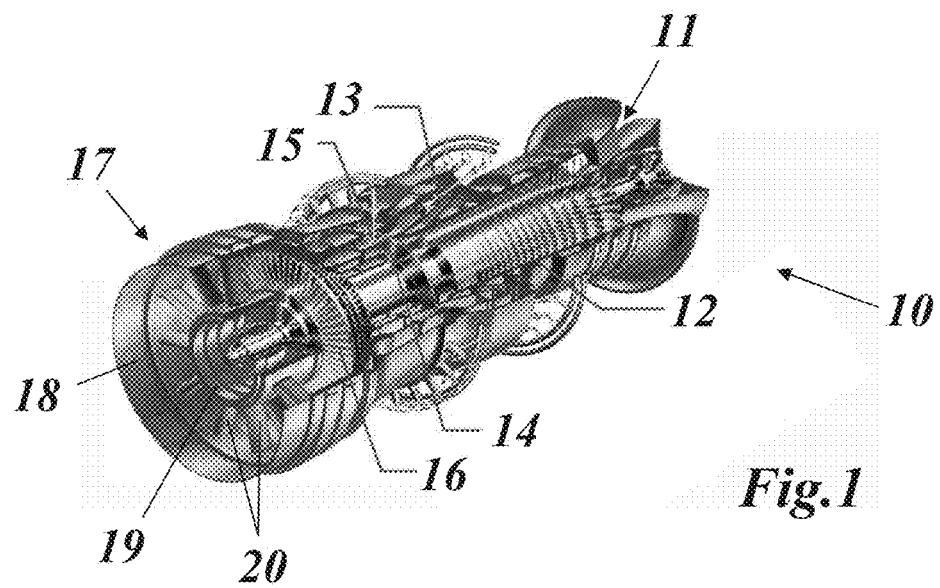
FIG. 1 shows in a perspective, partially sectioned view a stationary gas turbine with sequential combustion, as is suitable for realization of the invention.
Figure 2:
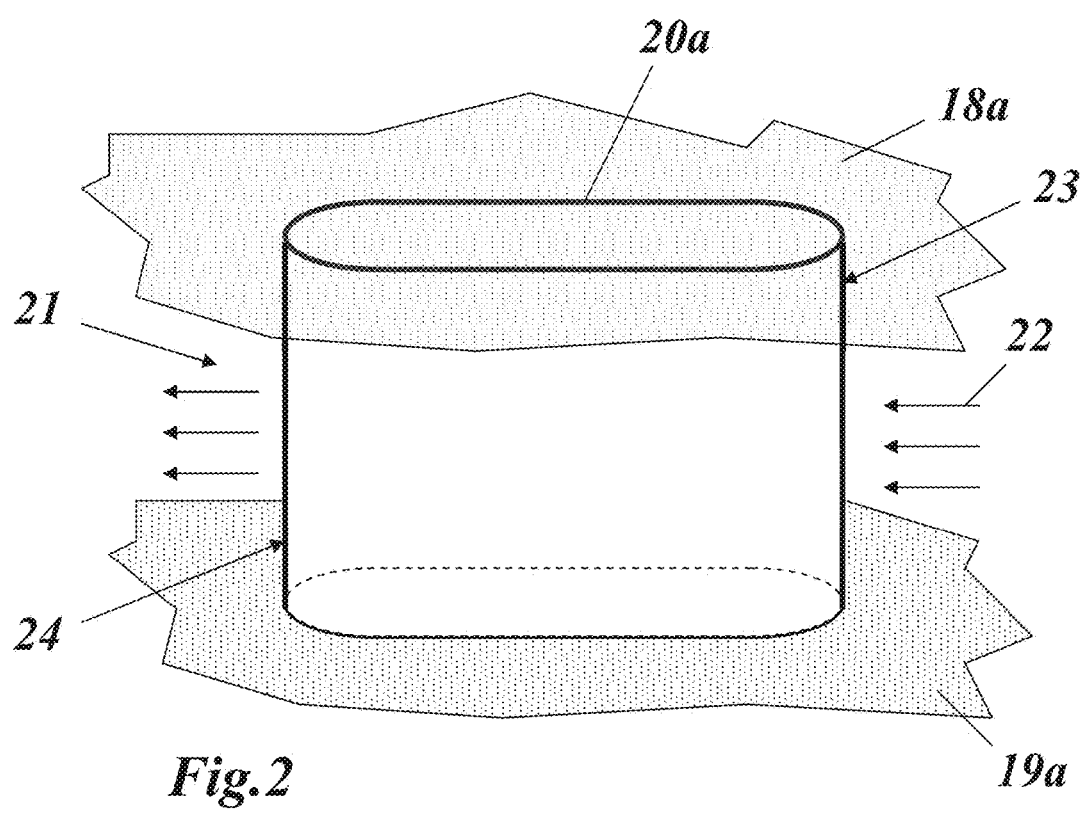
FIG. 2 shows in an enlarged detail a radial strut of the exhaust gas housing of the gas turbine from FIG. 1.

An embodiment of the invention is to create an exhaust gas housing for a gas turbine which avoids the disadvantages of known constructions and is distinguished by a directed relief of thermal stresses, and is to be realized in a simple manner without altering the construction and can also be used retrospectively with existing housings.

The present invention is based on the fact that damage to the exhaust gas housing starts with a stress which is associated with low cycle fatigue (LCF) and occurs between the radial struts and the concentric linings both on the leading edges and on the trailing edges. The cracks then propagate due to high cycle fatigue (HCF).

The present invention relates to an exhaust gas housing for a gas turbine, in which exhaust gas housing an annular gas passage, through which the exhaust gas discharges from the gas turbine to the outside, is formed by means of a concentric inner casing and an outer casing which concentrically encompasses the inner casing at a distance, wherein the inner casing and the outer casing are interconnected by means of a plurality of radial struts which extend through the gas passage and have in each case a leading edge and trailing edge with regard to the exhaust gas flowing through the gas passage, and wherein the struts, the outer casing and the inner casing are equipped in each case with a heat-resistant lining towards the gas passage. The invention is distinguished by the lining of the struts being at least partially mechanically decoupled from the lining of the inner casing and/or of the outer casing for reducing thermal stresses on the periphery of the struts.

According to one embodiment of the invention, stress relief cuts are provided for mechanical stress relief.

The stress relief cuts especially extend on the transition between struts and outer casing or inner casing and along the periphery of the struts.

Another embodiment of the invention is distinguished by at least one stress relief cut being arranged in the linings of inner casing or outer casing themselves.

It is also conceivable, however, that at least one stress relief cut is arranged in the linings of the struts themselves.

According to a further embodiment, stress relief cuts extend around the leading edges and/or trailing edges of the struts.

The stress relief cuts of the leading edges or trailing edges especially have two ends in each case and are terminated in each case by a larger drilled hole at the ends for reducing mechanical stresses and notch effect.

Another embodiment of the invention is distinguished by provision being made for stress relief cuts which extend in a closed curve around the struts in such a way that the linings of the struts are completely mechanically separated from the linings of the outer casing or of the inner casing.

According to a further embodiment, the stress relief cuts are covered by corresponding cover plates for sealing against the exhaust gas, without significantly impairing the mechanical decoupling effect of the stress relief cuts.

The gas turbine according to the invention is equipped with an exhaust gas housing according to the invention.

An embodiment of the invention attempts to avoid high thermal stresses in the transition phases of the gas turbine operation by a mechanical decoupling being undertaken, especially by means of stress relief cuts, at specific points of the exhaust gas housing. The mechanical decoupling or the stress relief cuts is, or are, to enable a relative movement between the struts and the lining so that no additional cracks originate from these regions.

As is shown in FIG. 3, stress relief cuts 25 and 27 can be introduced into the linings 18a or 19a around the leading edge 23 or trailing edge 24 respectively. At the ends, the stress relief cuts 25 and 27 are provided with drilled holes 26 of larger diameter for reducing stresses and notch effect. The optimum length of the stress relief cuts 25 and 27 is determined by the respective geometry and construction and can be adapted by the person skilled in the art accordingly.

Figure 5:
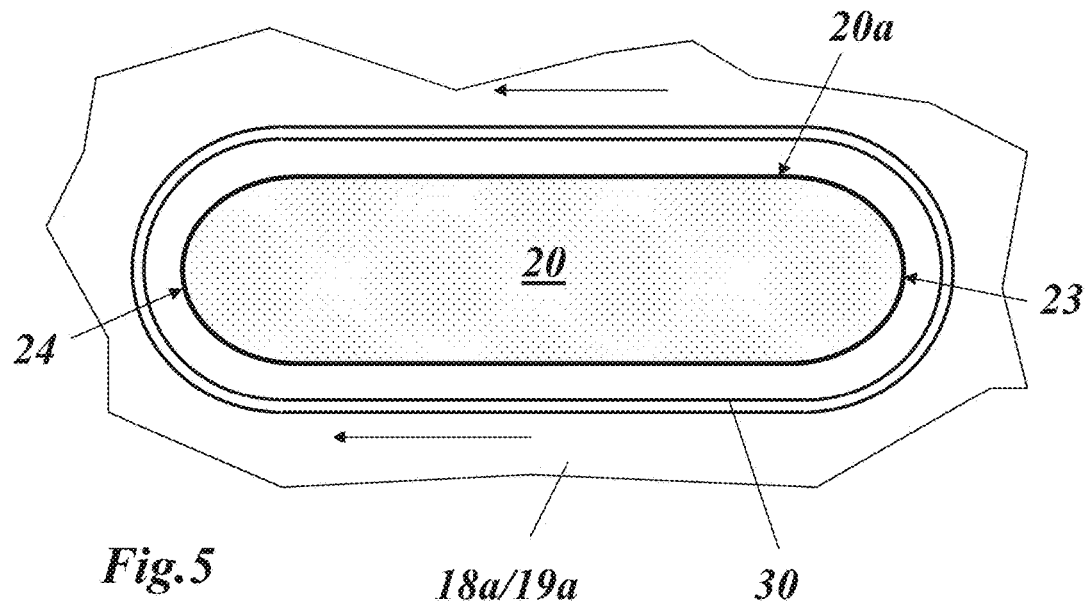
FIG. 5 shows in a view comparable to FIG. 3 a further exemplary embodiment of the invention with a closed stress relief cut extending around the strut.

It is also conceivable, however, according to FIG. 5, to provide a completely encompassing, closed stress relief cut 30 which completely separates the linings 18a and/or 19a from the lining 20a of the strut 20. In this case, the linings 18a/19a or 20a are fastened on the structure of the exhaust gas housing in a manner in which they are separated from each other.

Figure 6:
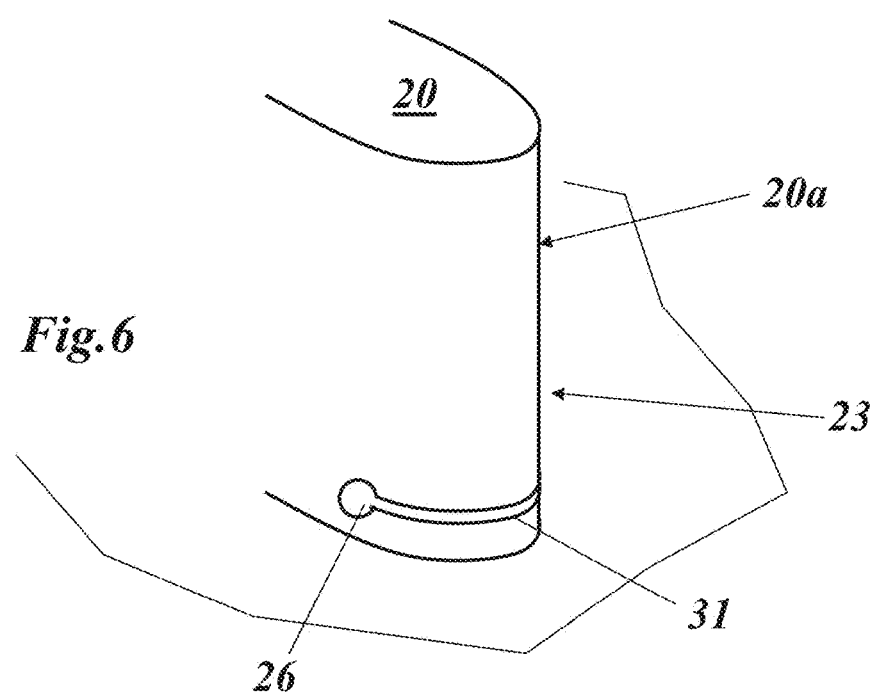
FIG. 6 shows in a perspective view a stress relief cut which is applied on the strut itself according to a further exemplary embodiment of the invention.

It is also conceivable, according to FIG. 6, to arrange the stress relief cuts 31 not in the encompassing linings 18a/19a but on the radial struts 20 themselves in order to achieve the necessary mechanical decoupling.

In all cases, the stress relief cuts 25, 27, according to FIG. 4, can be largely closed off by means of cover plates 28, 29 on the front side or rear side in order to reduce, or to completely prevent, leakage of exhaust gas without significant impairment of the mechanical decoupling. The cover plates 28, 29 can be welded on for this purpose.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the attached claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise.

LIST OF DESIGNATIONS

10 Gas turbine
11 Air intake
12 Compressor
13, 15 Combustion chamber
14, 16 Turbine
17 Exhaust gas housing
18 Outer casing
18a Outer lining (outer casing)
19 Inner casing 19a Lining (inner casing)
20 Radial strut
20a Lining (strut)
21 Gas passage
22 Exhaust gas
23 Leading edge (strut)
24 Trailing edge (strut)
25, 27, 30, 31 Stress relief cut
26 Drilled hole
28, 29 Cover plate

The invention claimed is:

1. An exhaust gas housing for a gas turbine, the exhaust gas housing comprising:
   an annular gas passage, configured to discharge an exhaust gas from the gas turbine to the outside, wherein the annular gas passage is formed by a concentric inner casing and an outer casing which concentrically encompasses the inner casing at a distance, wherein the inner casing and the outer casing are interconnected by a plurality of radial struts which extend through the gas passage and include in each case a leading edge and a trailing edge with regard to the exhaust gas flowing through the annular gas passage, wherein the radial struts include a third heat-resistant lining, the outer casing includes a first heat-resistant lining, and the inner casing include a second heat-resistant lining, in each case towards the annular gas passage, wherein the third heat-resistant lining of the struts is at least partially mechanically decoupled from (i) the first heat-resistant lining, (ii) the second heat-resistant lining, or (iii) the first heat-resistant lining and the second heat-resistant lining for reducing thermal stress on a periphery of the struts; and
   at least one stress relief cut in the first heat-resistant lining or the second heat-resistant lining, the at least one stress relief cut extending around the leading edges and/or the trailing edges of the struts, each of the at least one stress relief cut of the leading edges or the trailing edges having a pair of ends, each of the pair of ends terminating in a hole of larger diameter for reducing mechanical stresses.

2. The exhaust gas housing of claim 1, wherein the at least one stress relief cut comprises a stress relief cut extending around the leading edge, the trailing edge, or the leading and trailing edges of the struts.

3. The exhaust gas housing of claim 2, wherein the at least one stress relief cut comprises a plurality of the stress relief cuts.

4. The exhaust gas housing of claim 1, wherein the at least one stress relief cut is covered by a cover plate for sealing against the exhaust gas, without significantly impairing a mechanical decoupling effect of the at least one stress relief cut.

5. A gas turbine, comprising the exhaust gas housing of claim 1.

6. The exhaust gas housing of claim 1, wherein the at least one stress relief cut comprises a first, second, third, and fourth stress relief cut for mechanical stress relief.

7. The exhaust gas housing of claim 6, wherein the first, second, third, and fourth stress relief cuts extend on a transition between the struts and the outer casing or inner casing and along the periphery of the struts.

8. The exhaust gas housing of claim 6, wherein at least one of the first, second, or third stress relief cuts is arranged in the first heat-resistant lining or the second heat-resistant lining.

9. The exhaust gas housing of claim 6, wherein the first, second, and fourth stress relief cuts extend around the leading edge, the trailing edge, or the leading and trailing edges of the struts.

10. The exhaust gas housing of claim 6, wherein the first and second stress relief cuts are covered by corresponding cover plates for sealing against the exhaust gas, without significantly impairing the mechanical decoupling effect of the first and second stress relief cuts.

11. The exhaust gas housing of claim 1, comprising a stress relief cut, which extends in a closed curve around the struts in such a way that the third heat-resistant lining is completely mechanically separated from the first heat-resistant lining or the second heat-resistant lining.

12. An exhaust gas housing for a gas turbine, the exhaust gas housing comprising:
   an annular gas passage, configured to discharge an exhaust gas from the gas turbine to the outside, wherein the annular gas passage is formed by a concentric inner casing and an outer casing which concentrically encompasses the inner casing at a distance, wherein the inner casing and the outer casing are interconnected by a plurality of radial struts which extend through the gas passage and include in each case a leading edge and a trailing edge with regard to the exhaust gas flowing through the annular gas passage, wherein the radial struts include a third heat-resistant lining, the outer casing includes a first heat-resistant lining, and the inner casing include a second heat-resistant lining, in each case towards the annular gas passage, wherein the third heat-resistant lining of the struts is at least partially mechanically decoupled from (i) the first heat-resistant lining, (ii) the second heat-resistant lining, or (iii) the first heat-resistant lining and the second heat-resistant lining for reducing thermal stress on a periphery of the struts; and
   at least one stress relief cut in the third heat-resistant lining, the at least one stress relief cut extending around the leading edges and/or the trailing edges of the struts, each of the at least one stress relief cut of the leading edges or the trailing edges having a pair of ends, each of the pair of ends terminating in a hole of larger diameter for reducing mechanical stresses.

* * * * *